United States Patent Office 2,917,485
Patented Dec. 15, 1959

2,917,485

COMPOSITION OF HIGH MOLECULAR WEIGHT POLYISOBUTYLENE AND LOW MOLECULAR WEIGHT STYRENE-ISOBUTYLENE RESINOUS COPOLYMERS

Raymond G. Newberg, Roselle Park, N.J., and David W. Young, Homewood, Ill., assignors to Esso Research and Engineering Company, a corporation of Delaware No Drawing. Application October 5, 1955
Serial No. 538,796

5 Claims. (Cl. 260—45.5)

This invention pertains to a new composition of matter and to a method of producing the same.

It is an object of this invention to provide the art with an improved synthetic rubber-like material.

It is also an object of this invention to prepare an improved processing aid for use with synthetic rubber-like materials of the type obtainable by polymerization of an isoolefin at low temperature.

It is a further object of this invention to prepare compositions of low temperature isoolefin polymers of improved physical properties.

These and other objects will appear more clearly from the detailed description and claims which follow.

It is known that very valuable rubber-like polymeric substances can be produced by polymerizing an isoolefin of 4 to 5 carbon atoms per molecule, preferably isobutylene, by a low temperature procedure, and in the presence of a solution of a Friedel-Crafts type catalyst in a low freezing solvent which does not form a complex therewith, such as methyl or ethyl chloride or carbon disulfide. The temperatures applied range from about −40° C. to −100° C. or −150° C. or lower, the preferred range being from −80° C. to −103° C. This polymer has an average molecular weight ranging between 100,000 and 500,000 Staudinger.

One of the major criticisms of this polymer particularly when the molecular weight thereof is above 80,000 (Staudinger) has been the difficulty encountered in processing it, i.e., rolling or calendering, extruding and the like. For example, attempts have been made to utilize a composition comprising said polymer as insulation on electrical wire by extruding it around a wire core. It has been found unsatisfactory, however, not only because of the low rate at which it can be extruded but also because of the rough appearance of the coated wire obtained. Considerable difficulty has also been encountered in finding addition agents which are capable of improving the polymer and of making it more readily processable.

In order effectively to modify the properties of this polymer, the modifying agent must be a thermoplastic resinous material which is compatible with the polymer. The latter feature is important in order that the modifying agent will become thoroughly and uniformly blended with the polymer. The thermoplasticity of the modifier is also of considerable importance, since it is this property of the modifying agent which principally leads to improvement in plasticity of the final rubber-like composition.

It has now been found that the processing of the polymers of an isoolefin may be very markedly facilitated, if there is incorporated therewith a relatively low molecular weight copolymer of an olefin of from 3 to 5 carbon atoms and an aromatic vinyl compound such as styrene, or certain methyl or ethyl substituted styrenes. Such low molecular weight copolymers have an intrinsic viscosity below 0.5 and may be prepared, for example, by polymerizing mixtures of from 45 to 65 parts by weight of the vinyl aromatic compound and from 35 to 55 parts by weight of olefin in the presence of a Friedel-Crafts type catalyst at temperatures of between about −10° C. and about −40° C., preferably between −18° C. and −25° C. Copolymers having the desired low viscosity cannot be prepared at lower temperatures, e.g. below −50° C. At such low temperatures, preferably below −70° C., e.g. at −103° C., products having I.V. greater than 0.5, preferably greater than 0.7 are obtained. The I.V. may be determined in a suitable solvent such as toluene, using the following formula:

$$I.V. = \frac{2.303 \log_{10} \text{relative viscosity}}{\text{Conc. of copolymer/100 ml.}}$$

The olefins which may be used include propylene, butylenes or amylenes, the preferred olefin being isobutylene. The other component of the copolymer may be styrene, methyl- or ethyl-substituted styrenes, such as alpha methyl styrene, para methyl styrene, alpha methyl para methyl styrene, para ethyl styrene and the like. The polymerization is preferably effected in solution in solvents such as methyl chloride, propane and the like which can control the temperature of the reaction mixture by autorefrigeration. The copolymers contain from 45 to 65 wt. percent of combined vinyl aromatic compound, and have a molecular weight (Staudinger) ranging from about 5,000 to about 20,000 and preferably from about 6,000 to about 10,000. These copolymers are further characterized by possessing an intrinsic viscosity of less than 0.5, generally between 0.1 and 0.3. The preferred copolymer is a copolymer of 50 parts by weight of styrene and 50 parts by weight of isobutylene prepared at about −23° C. in liquid propane as diluent refrigerant by the use of aluminum chloride dissolved in methyl or ethyl chloride as catalyst.

The copolymers of an olefin and an aromatic vinyl compound may be blended with the polymers of an isoolefin in the ratio of from about 5 to about 50 parts by weight of the former with from about 95 to about 50 parts by weight of the latter. The preferred ratio is from 5 to 25 parts of olefin-aromatic resin with 95 to 75 parts of rubber. The two copolymers may be mixed in any desired way as by milling on rollers or in a mixer of the Banbury type or by mixing solutions of the respective copolymers in a suitable solvent whereupon the mixed solid polymers may be obtained by evaporation of the solvent.

Depending upon the use to which the products are to be put, there may be incorporated therewith the usual compounding ingredients, such as fillers, pigments, carbon black and the like in suitable quantities. The resultant compositions are characterized by being much easier to work up on milling rollers or the like and by being extrudable at a much faster rate than the isoolefin polymer per se.

The following examples serve to illustrate the present invention, but it is to be understood that the invention is by no means limited thereto:

EXAMPLE I 40 parts by volume of styrene and 60 parts by volume of liquid isobutylene were copolymerized in 2 volumes of methyl chloride using a 0.5% solution of AlCl$_3$ in methyl chloride as catalyst. The polymerization was conducted at the boiling point of the methyl chloride until the conversion was substantially complete. Upon completion of the polymerization the catalyst was destroyed and the solid polymer separated from the methyl chloride. This polymer contained about 50 wt. percent of combined styrene and had an intrinsic viscosity of less than 0.5.

The low temperature isoolefin polymer was prepared as follows:

100 parts by weight of isobutylene was diluted with about 200 parts of liquid ethylene at a temperature of about −95° C. to −100° C. A 1% solution of aluminum chloride in ethyl chloride precooled to about −100° C. was then sprayed into this reaction mixture in the ratio of about 1 part of the catalyst solution for each 25 parts of reaction mixture and the whole mixture was thoroughly agitated. The polymerization proceeded with high speed and was complete within a few minutes. The polymerization is exothermic and the heat generated was dissipated by vaporization of the ethylene. The reaction mixture was quenched and the solid polymer was separated from the residual ethylene and methyl chloride. The resultant polymer had a molecular weight of about 240,000.

The isobutylene polymer was milled and a portion of it was extruded as a solid rod without any loading material through an extruder fitted with an 0.4 inch die.

Other portions of the isobutylene polymer was mixed with isobutylene-styrene copolymers prepared as described above but containing from 10 to 80 wt. percent of styrene in accordance with the following recipe:

|   | Parts |
|---|---|
| Polyisobutylene | 100 |
| 2,6 di-tertiary butyl p-cresol | 0.25 |
| Stearic acid | 1 |
| Micro wax, 170° M.P. | 2 |
| Styrene-isobutylene copolymer | 15 |

After thorough milling each of these samples were extruded through the same extruder under the same temperature conditions, i.e., 35 lbs. of steam on the head and on the barrel. The following results were obtained:

The above data show that low molecular weight styrene-isobutylene copolymer containing 50 wt. percent combined styrene possesses unexpected extrusion properties, showing an extrusion rate of 100 in. per min. A copolymer containing 40% styrene has a very slow rate of 18 in. per min., while a copolymer containing 60% styrene is not much better having a rate of only 34 in. per min. The swell index of the copolymer containing 50% styrene is likewise excellent being 1.28 and is fully equal to that of the polybutene without any copolymer in it. In all other instances the presence of the copolymer increases the swell index considerably. The appearance of the extruded polymer containing the 50% styrene copolymer is very smooth, being superior to that obtained with any other type of copolymer.

EXAMPLE II

A high molecular weight polyisobutylene having a Staudinger molecular weight of 270,000 was mixed with 15 parts of both high and low molecular weight styrene-isobutylene copolymers containing different amounts of styrene and the extrusion characteristics determined. The following results were obtained:

|   | 1 | 2 | 3 | 4 | 5 | 6 | 7 |
|---|---|---|---|---|---|---|---|
| Polyisobutylene (270,000 m. wt.) | 100 | 100 | 100 | 100 | 100 | 100 | 100. |
| Stearic Acid | 1 | 1 | 1 | 1 | 1 | 1 | 1. |
| Micro Wax, 170° M.P. | 2 | 2 | 2 | 2 | 2 | 2 | 2. |
| S-40 [1] |  | 15 |  |  |  |  |  |
| S-50 [1] |  |  | 15 |  |  |  |  |
| S-60 [1] |  |  |  | 15 |  |  |  |
| PS-40 [2] |  |  |  |  | 15 |  |  |
| PS-50 [2] |  |  |  |  |  | 15 |  |
| PS-60 [2] |  |  |  |  |  |  | 15. |
| Extrusion, @ 260° F., 80 R.P.M., die 0.4″ O.D. x 0.3″ I.D.: |  |  |  |  |  |  |  |
| Length, ins./min. | 92.3 | 64.3 | 67 | 62.8 | 38.5 | 61.5 | 36. |
| Weight, gm./min. | 152 | 174 | 174 | 167.5 | 162 | 182 | 168. |
| Swell Index | 1.63 | 2.70 | 2.60 | 2.62 | 4.18 | 2.96 | 4.67. |
| Appearance | med. rough, porous. | rough, slightly porous. | rough, slightly porous. | rough, slightly porous. | rough, porous. | smooth, dense. | smooth, dense. |
| Stress Strain |  |  |  |  |  |  |  |
| Tensile | 1,200 | 1,310 | 1,245 | 1,175 | 1,095 | 1,095 | 630. |
| Elongation, percent | 965 | 995 | 860 | 830 | 990 | 975 | 960. |

[1] High molecular weight styrene-isobutylene copolymer containing the indicated amount of styrene. (I.V. above 0.7.)
[2] Low molecular weight styrene-isobutylene copolymer containing the indicated amount of styrene. (I.V. below 0.5.)

The above results show that blends of high molecular weight styrene-isobutylene copolymers in high molecular weight polyisobutylene results in compositions which extrude with rough appearance and with objectionable porosity. Blends with low molecular weight styrene-isobutylene copolymers on the other hand result in a readily extrudable composition which has good tensile and elongation properties.

Thus, in accordance with the invention, very high molecular weight polyisobutylenes of 100,000 molecular weight and above are plasticized by the addition of 5 to 25 wt. percent of a copolymer of isobutylene and styrene containing 45 to 65, preferably 50, wt. percent of styrene,

H.M. Vistanex—low mol. wt. S-polymer blends

|   | 1 | 2 | 3 | 4 | 5 | 6 | 7 | 8 |
|---|---|---|---|---|---|---|---|---|
| Polyisobutene (240,000 m. wt.) | 100 | 100 | 100 | 100 | 100 | 100 | 100 | 100. |
| PS-10 [1] | 15 |  |  |  |  |  |  |  |
| PS-30 [1] |  | 15 |  |  |  |  |  |  |
| PS-40 [1] |  |  | 15 |  |  |  |  |  |
| PS-50 [1] |  |  |  | 15 |  |  |  |  |
| PS-60 [1] |  |  |  |  | 15 |  |  |  |
| PS-70 [1] |  |  |  |  |  | 15 |  |  |
| PS-80 [1] |  |  |  |  |  |  | 15 |  |
| Tensile | 570 | 350 | 1,000 | 1,050 | 1,130 | 595 | 890 | 955. |
| Mod. @100% | 25 | 50 | 75 | 75 | 85 | 90 | 100 | 10. |
| Elongation | 760 | 1,000 | 840 | 840 | 700 | 695 | 685 | 785. |
| Shore, Type A | 30 | 32 | 38 | 43 | 47 | 51 | 48 | 36. |
| Extrusion @ 260° F., 80 r.p.m., die 0.4″ O.D. x 0.3″ I.D.: |  |  |  |  |  |  |  |  |
| Length, in./min. | 16 | 22 | 18 | 100 | 34 | 52.5 | 38 | 62. |
| Weight, gm./min. | 56.6 | 52.3 | 54.6 | 128 | 77.2 | 92.8 | 77 | 77.7. |
| Swell Index | 3.54 | 2.56 | 3.33 | 1.28 | 2.27 | 1.77 | 2.03 | 1.24. |
| Appearance | Med. Rough. | Med. Rough. | Med. Rough. | Very Smooth. | Smooth. | Smooth. | Smooth, not compatible. | Smooth, not compatible. |

[1] Styrene-isobutylene copolymer containing the indicated amount of styrene and having an intrinsic viscosity of less than 0.5.

said copolymer having a molecular weight of between 5,000 and 20,000 and an intrinsic viscosity of less than 0.5. The products thus obtained have swell indexes below 1.3 and extrusion rates of 100 in. per min.

The nature of the present invention having been thus fully set forth and specific examples of the same given, what is claimed as new and useful and desired to be secured by Letters Patent is:

1. A composition of matter comprising a mixture of from 5 to 25 parts by weight of a resinous copolymer of a polymerizable unsaturated aromatic hydrocarbon selected from the class consisting of styrene and methyl and ethyl substituted styrenes and an olefin of from 3 to 5 carbon atoms, said copolymer containing from 45 to 65 wt. percent of combined polymerizable unsaturated aromatic compound, a molecular wt. between 5,000 and 20,000 and an intrinsic viscosity of less than 0.5, with from 95 to 75 parts by weight of a polymer of an iso-olefin of less than 8 carbon atoms per molecule and having a molecular weight above 100,000, being difficultly processable, and when extruded making products having a very rough surface and a high swell index, and said mixed composition being easily processable and when extruded making products having a smooth surface and a swell index not above about 1.3.

2. A composition of matter comprising a mixture of from 5 to 25 parts by weight of a resinous copolymer of styrene and isobutylene, said copolymer containing from 45 to 65 wt. percent of combined styrene, a molecular wt. between 5,000 and 20,000 and an intrinsic viscosity of less than 0.5 with from 95 to 75 parts by weight of a polymer of isobutylene and having a molecular weight above 100,000, and being difficultly processable, and when extruded making products having a very rough surface and a high swell index, and said mixed composition being easily processable and when extruded making products having a smooth surface and a low swell index.

3. A composition of matter comprising a mixture of from 5 to 25 parts by weight of a resinous copolymer of styrene and isobutylene containing about 50 wt. percent of combined styrene, a molecular wt. between 6,000 and 10,000 and an intrinsic viscosity of less than 0.5, with from 95 to 75 parts by weight of a polymer of isobutylene and having a molecular weight of 100,000 to 300,000, and being difficultly processable, and when extruded making products having a very rough surface and a high swell index, and said mixed composition being easily processable and when extruded making products having a smooth surface and a low swell index.

4. A composition of matter comprising a mixture of 15 parts by weight of a resinous copolymer of styrene and isobutylene, said copolymer containing 50 wt. percent of combined styrene, a molecular wt. between 6,000 and 10,000 and an intrinsic viscosity of less than 0.5, with 85 parts by weight of a polymer of isobutylene and having a molecular weight about 240,000, and being difficultly processable, and when extruded making products having a very rough surface and a high swell index, and said mixed composition being easily processable and when extruded making products having a smooth surface and a low swell index.

5. A composition of matter comprising a mixture of 15 parts by weight of a resinous copolymer of styrene and isobutylene, said copolymer containing 50 wt. percent of combined styrene, a molecular weight between 6,000 and 10,000 and an intrinsic viscosity of less than 0.5, with 85 parts by weight of a polymer of isobutylene and having a molecular weight about 270,000, and being difficultly processable, and when extruded making products having a very rough surface and a high swell index, and said mixed composition being easily processable and when extruded making products having a smooth surface and a low swell index.

References Cited in the file of this patent

UNITED STATES PATENTS

| | | |
|---|---|---|
| 2,213,423 | Wiezevich | Sept. 3, 1940 |
| 2,274,749 | Smyers | Mar. 3, 1942 |

FOREIGN PATENTS

| | | |
|---|---|---|
| 577,860 | Great Britain | June 4, 1946 |
| 468,558 | Canada | Oct. 3, 1950 |